United States Patent [19]

Hill et al.

[11] 4,034,326

[45] July 5, 1977

[54] TEMPERATURE SENSITIVE TRIP DEVICE

[75] Inventors: John Hill, Bickley; Henryk Turczanski, Beckenham, both of England

[73] Assignee: Comtelco (U.K.) Limited, Tonbridge, England

[22] Filed: Apr. 17, 1975

[21] Appl. No.: 569,013

[52] U.S. Cl. .................................. 337/34; 361/124; 361/104; 337/407

[51] Int. Cl.² ..................... H01H 37/04; H02H 1/04

[58] Field of Search ....................... 317/40 A, 9, 66; 337/32, 28, 29, 31, 33, 34, 402, 403, 404, 405, 406, 407, 408

[56] References Cited

UNITED STATES PATENTS

| | | | |
|---|---|---|---|
| 1,057,784 | 4/1913 | Topp | 337/405 |
| 1,935,611 | 11/1933 | Bourbon | 337/407 |
| 2,105,113 | 1/1938 | Gibson | 337/405 |
| 2,799,807 | 7/1957 | Schultz et al. | 317/40 A |
| 3,275,774 | 9/1966 | Miller | 337/405 |
| 3,782,358 | 1/1974 | Lenz | 337/407 |
| 3,813,577 | 5/1974 | Kawiecke | 317/40 A |

FOREIGN PATENTS OR APPLICATIONS

| | | | |
|---|---|---|---|
| 67,854 | 5/1892 | Germany | 337/402 |

*Primary Examiner*—Harold Broome
*Attorney, Agent, or Firm*—Weingarten, Maxham & Schurgin

[57] ABSTRACT

A temperature sensitive-trip device for use on an electrical surge arrestor and comprising a resilient contact member mounted on the arrestor and having a fusible material solidified in contiguous relationship therewith to hold contact member biassed so that on melting of fusible material, contact member is urged to a position in which it shorts the electrodes of the arrestor.

4 Claims, 5 Drawing Figures

TEMPERATURE SENSITIVE TRIP DEVICE

The present invention relates to a temperature-sensitive trip device.

The present invention is particularly useful with electrical surge arrestors employed to protect signal transmission lines against induced voltage surges. An electrical surge arrestor in its simplest form comprises two electrodes hermetically seated to an insulating envelope by which the electrodes are held spaced apart to form an arcing gap. One of the electrodes is connected to a transmission line and the other to earth so that when a surge is experienced on the transmission line, an arc is struck across the gap and the excess voltage represented by the surge thereby taken to earth. The most usual form of arrestor now employed is the dual device providing two line electrodes for connection to respective ones of a transmission line pair, and commoned earth electrodes along with two envelopes, to form a unified structure in which two gaps are provided viz: between each line and earth.

Some known arrestors are "fail-safe", that is to say, a line electrode and an earth electrode and designed to fuse together or one of them to soften and collapse into the other, when the energy dissipation in the line electrode exceeds a certain level so that a direct connection is provided to earth.

Experience has now shown that surge arrestors as above described, whether fail-safe or not, at energy dissipation levels considerably below those for which fail safe operation is provided, heat up to temperatures which give rise to a fire risk. To counteract this, arrestors have been provided with temperature-sensitive earth trips which act to bridge electrode terminal pieces of an arrestor with a spring urged, rigid contact member at a pre-determined temperature so as to provide a direct short between the arrestor terminals to reduce the energy dissipation in the electrodes and thus the temperature generated by the energy dissipation.

The existing trip devices, however, are unsatisfactory. They consist of several separate parts some at least of which are held in contact with one another only by the resilient bias of the spring and can, therefore, be dislodged by mechanical shock. In some of the devices, the parts are not visible in the completed assembly with the result that a part could be omitted during assembly and the omission not subsequently noticed. This danger would also arise if the arrestor were dismantled for any reason following manufacture e.g. during installation. Again, all the existing devices use a discrete fusible pellet or slug which may not melt symmetrically and consequently may cause the contact member to jam or make poor contact with an electrode terminal piece. Further, all the existing devices necessarily require some kind of base or mounting device on which the trip device can be assembled and this increases the expense and physical size of the device.

It is an object of the present invention to provide a temperature-sensitive trip device to overcome the abovementioned disadvantage.

It is a further object of the present invention to provide a temperature-sensitive trip device which is also of a more general utility.

Briefly, the invention uses a contact member which itself is resilient and is mounted on the arrestor; and a rigid, flexible material is solidified in contiguous relationship with the contact member normally to hold it resiliently biassed away from a position in which it forms a connection between a line electrode and an earth electrode, so that when the fusible material melts (its melting point being chosen at the temperature above which a fire hazard would arise) the contact member is released and moves under the force of its resilient bias to assume said position amd thus short circuit the two electrodes.

The contact member may be a coil spring carried round the insulating envelope of the arrester or a respective one thereof; or it may be a spring arm secured at one end to one electrode of a line and earth electrode pair, of a length to span the two electrodes and providing a contact surface at its other end of the other electrode. In the case of the coil spring, the spring may be held compressed by the fusible material so as to expand on melting of the fusible material to make contact at its ends respectively, with the line electrode and earth electrode concerned, if the latter are suitably formed, or with suitable terminals attached to the electrodes. The terminals may also serve to prevent removal of the coil spring from the arrester, and thus prevent inadvertent loss of the spring, although the spring could be made captive on the arrestor by other means, for instance, by a deposition of wax or other suitable fusible material of a melting point not higher than the material used to hold the spring in the resiliently biassed condition. In the case of the spring arm, the fusible material may be solidified against it adjacent its point of attachment to the electrode concerned and at its side facing the arrestor, to act as, a block between the arrestor and the arm supporting the arm so as to hold it tensed away from the arrestor whereby on melting of the fusible material, the arm is released to bring its contact surface into engagement with the other electrode under the force of the resilient bias of the arm.

For a dual surge arrestor, two contact members are used. Thus, two coil springs would be used, one mounted round each envelope, or two spring arms would be used which could take the form a single spring strip secured at substantially its mid point to the compound earth electrodes.

The spring arm, or each of them, may be made of any suitable metal, e.g. copper, and may be soldered or brazed to the electrode. The coil spring, or each of them, may consist of steel (suitably coated for tinning) or of beryllium or copper.

The arrestor of the present invention, may be packaged in a plastics envelope, preferably a clear plastics such as that sold under the trade marks "DEROTON" or "VALOX", which is a glass filled, fire retardant polyester of a melting point of 222° to 230° C; and it may be provided with flying leads from the electrodes or electrode terminals so that arrestor can be directly connected to the line and earth terminals of the transmission system.

The fusible material may be a solder or other fusible, eutetic alloy or a wax. For most applications, a standard solder will be found suitable, but it will be understood that the fusible material chosen will depend on the particular application in which the arrestor is to be used since it is this that will determine what temperatures may be tolerated and what melting characteristics the fusible material should have. For instance, it might be that higher temperatures could, or might need to be tolerated outdoors than indoors, and consideration would need to be given to the materials surrounding the arrestor in its use.

Generally, however, the melting point of the fusible material will not be less than 60° and not more than 400° C.

Standard solders will give melting points in the upper part of the above range; and suitable eutetic alloys including a lead free solder, of melting points below those of standard solders, are shown in Table I hereinbelow. If melting points above 400° C are required, brazing and silver solders may be used.

It may also be feasible to use thermoplastics.

respectively are hermetically sealed, line electrode 1 and the corresponding earth electrode, and line electrode 2 and its corresponding earth electrode. The common terminal 3 and the earth electrode are formed to provide a communicating passageway (not shown) between the interiors of the respective insulating envelopes.

The trip device comprises, in respect of each pair of electrodes, a coil spring 11 or 12 (shown in section in FIG. 1) mounted around the respective insulating envelope and held in a compressed condition by the solidification thereon of a rigid fusible material 13, in this

TABLE I

EUTECTIC FUSIBLE ALLOYS

| No. | Alloy | Melting Point | Weight lbs. cu. in. | Tensile Strength tons/ sq. in. | Elon-ga-tion % | Brinell Hard-ness | Joint Strength on Brass tons/ sq. in. | Soldering Qualities | Special Features |
|---|---|---|---|---|---|---|---|---|---|
| 2 | Bismuth-Lead-Tin-Cadmium | 70° C 158° F | .34 | 1.6 | 200 | 7.2 | 1.3 | Good with all types of flux. | Wood's metal, Melts in warm water. Expands on solidification. |
| 7 | Bismuth-Cadmium-Lead | 91° C. .37 196° F | 2.2 | 100 | 7.5 | 0.9 | Does not tin | readily; requires an active flux. | |
| 9 | Bismuth-Lead-Tin | 95° C 203° F | .35 | 2.6 | 130 | 9.6 | 0.5 | Fair; active flux recommended. | Expands on solidification; just melts in boiling water. |
| 11 | Bismuth-Cadmium-Tin | 103° C 217° F | .32 | 3.9 | 160 | 16.0 | 1.1 | Fair; active flux recommended. | |
| 15 | Bismuth-Lead | 124° C 256° F | .38 | 2.6 | 70 | 9.6 | 1.0 | Does not tin readily; requires an active flux. | Non-shrinking alloy for foundry patterns. |
| 17 | Bismuth-Tin | 138° C 281° F | .31 | 4.3 | 0.2 | 9.6 | 0.7 | Good with all types of flux. | Expands on solidification; gives accurate reproduction of the mould. |
| 18 | Tin-Lead-Cadmium | 145° C 293° F | .29 | 3.4 | 78 | 13.2 | 1.8 | Good with all types of flux. | Excellent alloy for low temperature soldering. |
| 20 | Bismuth-Cadmium | 144° C 291° F | .34 | 3.3 | 0.5 | 14.2 | 1.2 | Good with all types of flux. | Expands on solidification. |
| 21 | Tin-Cadmium | 177° C 351° F | .28 | 4.2 | 250 | 14 | 2.1 | Good with all types of flux. | Lead-free solder. |
| | Tin-Lead | 183° C 361° F | .30 | 4.6 | 20 | 13.8 | 2.6 | Good with all types of flux | Lowest melting point tin lead solder. |

The invention will now be described, by way of example only, with reference to the accompanying drawings in which like reference numerals are used to indicate like parts and in which.

Figure 1:
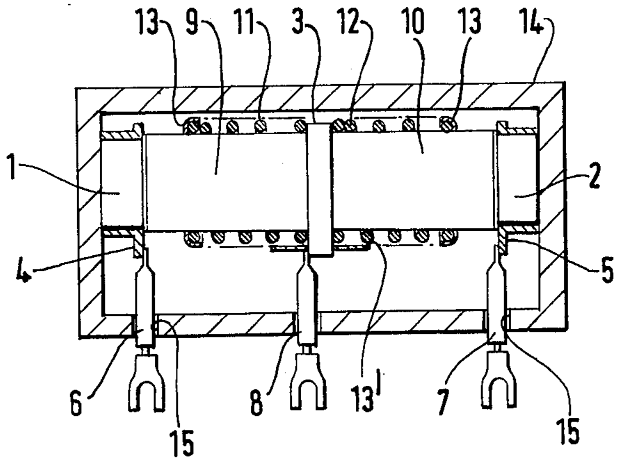
FIG. 1 is a plan view of an encapsulated and electrical surge arrestor employing a trip device according to the present invention, shown before operation of the trip device.
Figure 3:
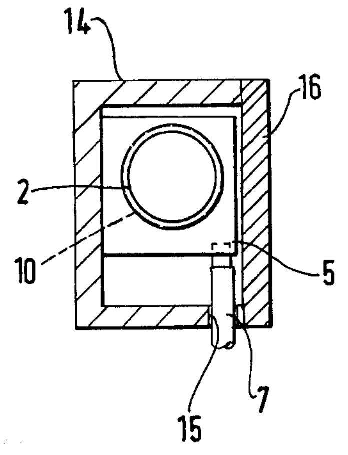
FIG. 3 is an end elevation of the arrestor as shown in FIG. I.
Figure 2:
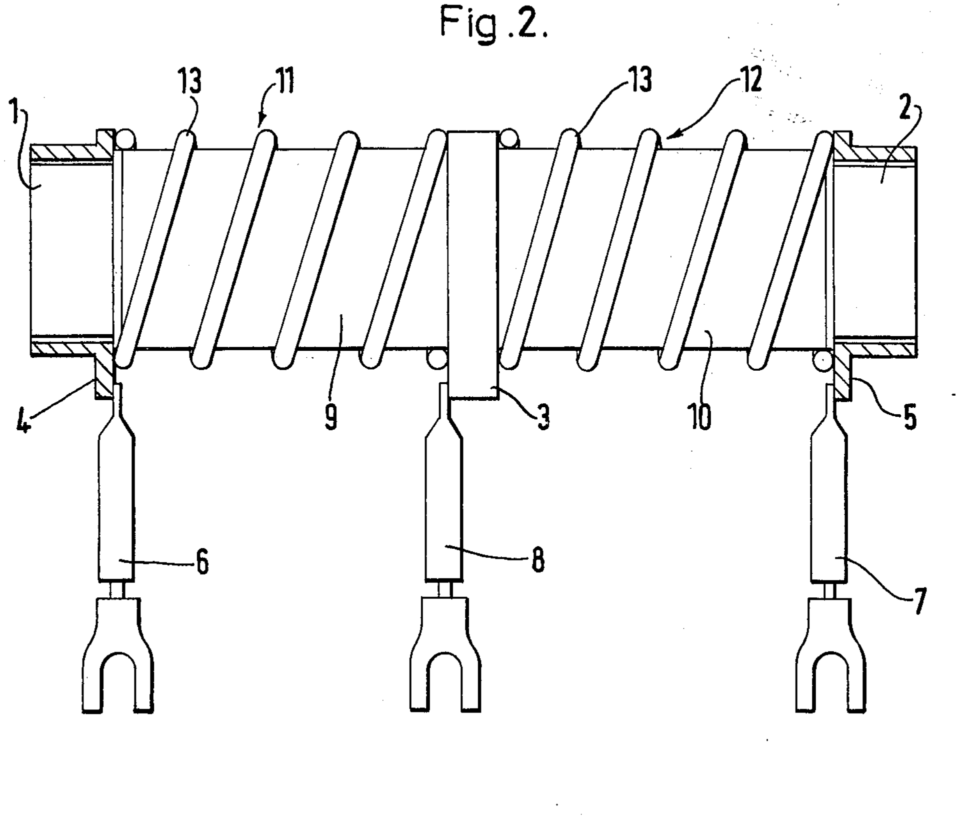
FIG. 2 is a plan view of the arrestor of FIG. I showing the trip device after operation; the scale being enlarged in the interests of clarity.

Referring now to FIGS. 1 to 3, the arrestor comprises a first line electrode 1, a second line electrode 2, respective earth electrodes (not shown) joined to a common terminal 3, line terminals 4 and 5 welded respectively to the line electrodes 1 and 2, flying leads 6, 7 welded respectively to the line electrode terminals 4, 5, and flying common earth lead 8 welded to the common terminal 3, and insulating envelopes 9, 10 to which case, a lead-tin solder. The deposition of the solder may be carried out by mounting a number of the coil springs on a rod coated with release agent, with each two adjacent springs separated by a washer coated with release agent, axially compressing the springs on the rod, dipping the springs in molten solder, withdrawing the rod and removing the springs therefrom when the solder has solidified thereon so that the solder itself then maintains the springs in a compressed condition. A spring is then mounted around each insulating envelope before the electrode terminals are welded to the electrodes. To prevent the springs from shifting about on the insulating envelopes, they may be located by a deposit of wax conveniently in the form a single strand 13' joining the springs at their adjacent ends.

When in use of the arrestor, the solder melts, one or both spring uncoils under the force of the resilient bias of its compression to cause its ends respectively to make contact with a line electrode terminal and the opposing face of the common earth terminal as shown in FIG. 2, thus short circuiting the respective line electrodes to earth.

The arrestor of FIGS. 1 and 2 is encapsulated in a plastics box 14 having slots 15 in a lateral wall to permit entry of the flying leads; and the box is closed with a press-on lid 16 as shown in FIG. 3.

Figure 4:
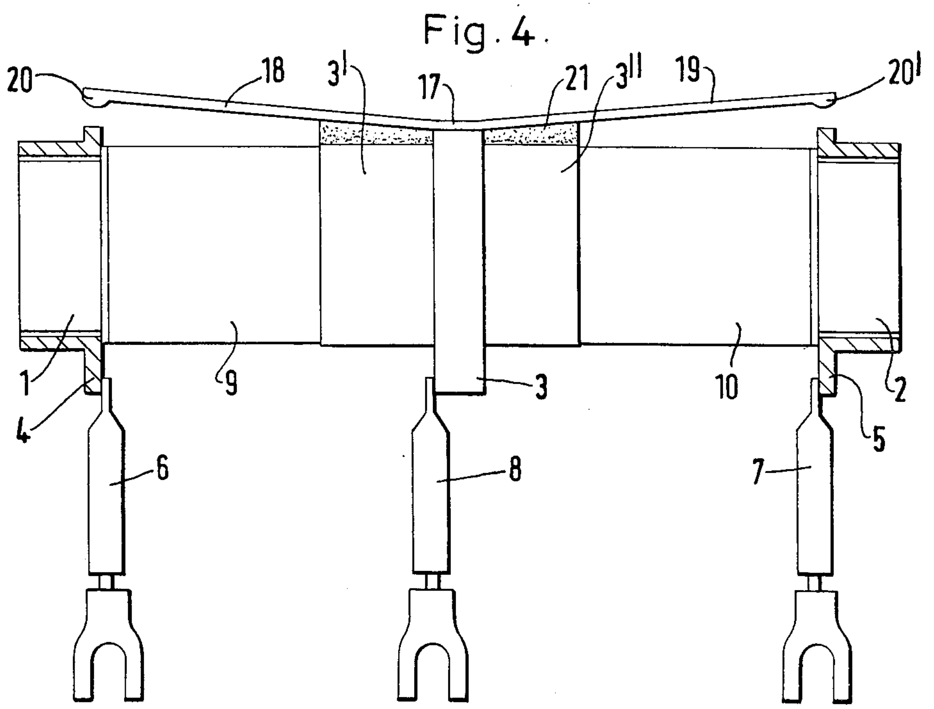
FIG. 4 is a side elevation of a dual electrical surge arrestor employing a further trip device according to the invention, showing the device before operation.
Figure 5:
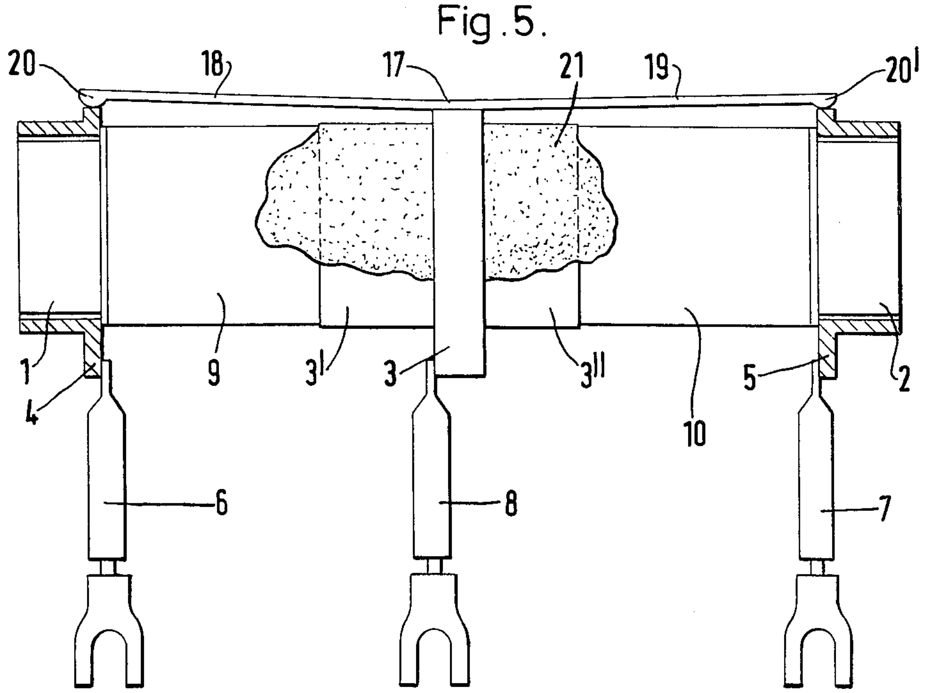
FIG. 5 is a side elevation of the arrestor of FIG. 3, after operation of the trip device.

Since the surge arrestor per se of FIGS. 4 and 5 is identical with that of FIGS. 1 to 3, it will not be further described; and, in the interests of clarity, it is shown without the encapsulation illustrated in FIGS. 1 and 3.

The trip device employed with the surge arrestor of FIGS. 4 and 5, comprises a single strip of spring metal 17 welded at substantially its mid point to the common terminal 3 of the arrestor. The strip forms two spring arms 18, 19 respectively spanning the axial distance between the common terminal 3 and line electrode 1, and the axial distance between common terminal 3 and line electrode 2. Each spring arm, at its end adjacent a line electrode provides a contact surface in the form of a pointed stud 20, 20'. Between each spring arm, adjacent its point of attachment to the common terminal 3, and a sleeve 3', 3'' integral with common terminal 3, a fusible material 21, again, in this instance, a solder is solidified so that the material forms a block lying between the arm and the respective insulating envelope to hold the spring arm tensed and resiliently biassed so as to urge its contact surface towards the respective line electrode. As a result, when the solder melts, the end of the arm bearing the contact surface is brought firmly into contact with the surface of the respective line electrode to short the electrode to earth.

The present invention is not limited to use with an electrical surge arrestor. Thus, the contact element could be used in many electrical arrangements to provide a temperature-sensitive trip action; or its mechanical action on release by the fusible material, on melting of the latter, could be used to operate, say, a valve or a movable electrical contact.

We claim:

1. A temperature sensitive trip device comprising:

an elongated, cylindrical, electrically insulative support;

at least first and second electrical terminals affixed to said support and spaced axially along the length thereof;

a resilient, cylindrical coil spring mounted about said support and axially extending therealong between said at least first and second terminals and electrically connected to one of said terminals;

said coil spring being capable of assuming a first condition in which a connection is formed between said first and second terminals and a second condition in which said spring is resiliently biased out of connection between said first and second terminals;

a rigid, solidified, fusible material disposed along the length of said coil spring and joining together each coil of said spring to retain said spring in said second condition in a compressed state against the resilient bias thereof;

said fusible material, upon melting by heat from said support, causing release of said coil spring into a biased axial movement to said first condition.

2. For use in an electrical surge arrestor having a line electrode, an earth electrode, and an insulating envelope in which the electrodes are hermetically sealed, a temperature sensitive trip device comprising:

a resilient, cylindrical coil spring mounted about said insulating envelope of said arrestor and affixed in electrical connection to said earth electrode, and capable of, when so mounted, assuming a first condition in which said spring forms a connection between said earth electrode and said line electrode, and a second condition in which said spring is resiliently biased out of connection between said earth electrode and said line electrode;

a rigid, fusible material disposed on and joining together each of the compressed coils of said spring to retain said spring in said second condition, such that for as long as the fusible material remains solidified, the spring is retained in said second condition, and that upon melting of the fusible material by heat from said envelope, the spring is released, causing it to undergo movement under the force of its resilient bias to assume said first condition.

3. For use in a dual electrical surge arrestor having a first line electrode, a second line electrode, a first earth electrode, and second earth electrode joined together to form a unitary structure, a first insulating envelope to which the first line electrode and first earth electrode are sealed, and a second insulating envelope to which the second line electrode and second earth electrode are sealed, a temperature sensitive trip device comprising in respect of each line and earth electrode pair:

a resilient coil spring mounted about the respective insulating envelope of the arrestor and affixed in electrical connection to the earth electrode, and capable of, when so mounted, assuming a first condition in which said spring forms a connection between the respective line electrode and earth electrode, and a second condition in which said spring forms no such connection and is resiliently biased;

a rigid, fusible material disposed on and joining together the compressed coils of the spring to retain the spring in said second condition against its resilient bias, such that as long as the fusible material remains solidified, the spring is retained in said second condition and that upon melting of the fusible material by heat from said envelope, the spring is released to cause it to undergo movement under the force of its resilient bias to assume said first condition.

4. A temperature sensitive trip device according to claim 3 including:

wax material disposed on at least one coil of said spring and joining said coil to said insulating envelope to restrain movement of said spring in its first condition on said envelope.

* * * * *

UNITED STATES PATENT AND TRADEMARK OFFICE

CERTIFICATE OF CORRECTION

PATENT NO. : 4,034,326

DATED : July 5, 1977

INVENTOR(S) : John Hill and Henryk Turczanski

It is certified that error appears in the above-identified patent and that said Letters Patent are hereby corrected as shown below:

Column 1, line 30, after "not," insert --can,--.
Column 2, line 14, delete "of" and insert --to engage--.
TABLE 1 under Columns 3 and 4, No. 7, Alloy Bismuth, the line should read as follows:

Melting Point - 91°C
Weight lbs. cu. in - .37
Tensile Strength tons/sq. in. - 2.2
Elongation % - 100
Brinell Hardness - 7.5
Joint Strength on Brass tons/sq. in. - 0.9
Soldering Qualities - Does not tin

Signed and Sealed this

*Eighth* Day of *November 1977*

[SEAL]

*Attest:*

RUTH C. MASON
*Attesting Officer*

LUTRELLE F. PARKER
*Acting Commissioner of Patents and Trademarks*